Jan. 19, 1932.     S. D. HARTOG     1,842,022
PISTON
Filed Feb. 16, 1920

Inventor
Stephen D. Hartog

Patented Jan. 19, 1932

1,842,022

UNITED STATES PATENT OFFICE

STEPHEN D. HARTOG, OF ST. LOUIS, MISSOURI, ASSIGNOR, BY MESNE ASSIGNMENTS, TO THE CLEVELAND TRUST COMPANY, OF CLEVELAND, OHIO, A CORPORATION OF OHIO

PISTON

Application filed February 16, 1920. Serial No. 359,137.

This invention relates to piston, more particularly to pistons for use in internal combustion engines.

The piston is the movable member within the cylinder of the engine and in the internal combustion engine the head portion of the piston is subjected to direct contact with the high heat temperature caused by the frequent explosions of the ignited gases. The piston unlike the cylinder is not provided with means for cooling or controlling its temperature and the head portion thereof, quite frequently attains a temperature of 750 to 1000 degrees Fahrenheit. This heat temperature causes the piston to expand and this expansion of the piston is greater than that of the cylinder in which it operates, consequently, the piston must be smaller in diameter than the diameter of the bore of the cylinder to admit of its expansion allowing the piston movable action in the cylinder free from binding, which would otherwise occur were the piston made to a size to fit the cylinder when cold.

The head portion of the piston receives its heat by direct contact, the body portion by transmission, the head portion therefore must be made smaller than that of the body portion.

The piston as thus made would yet be unsuccessful operatively if it were not for the use of split metallic packing rings employed solely to pack the space between the piston and the cylinder and ordinarily positioned in grooves cut in the head section of the piston. The piston as ordinarily made with grooves and packing rings therein lack the requisite features of a more desirable construction in that the looseness of the piston tends to wear the cylinder out of cylindrical truth. The delicate structure of the rings causes them to lose their tension due to the high heat temperature to which they are subjected, consequently, failing in their function to properly pack the cylinder against leakage, causing loss of compression, also permitting the lubricating oil not only to enter the combustion chamber resulting in irregular ignition, but also permitting lubricating oil to secrete beneath the rings between their inner surface and the bottom of the grooves resulting in the formation of carbon therebetween causing a solid mass to form which forces the rings against the cylinder wall and not infrequently results in scoring the cylinder.

The present invention is designed to overcome all of the objections above described and as inhering in the prior art construction, by constructing the piston in such a novel way as will eliminate the objections referred to and to such ends the invention comprises a piston having a head and body free from ring grooves. The head and body united by suitable ribs constructed in a manner providing a yielding capacity. The body of the piston being parted from the head and a slit or series of slits cut through the body and terminating at the parting between the head and the body. Sealing means for the head and body and positioned in the space therebetween.

The object therefore, of the present invention is to construct a piston free from rings and ring grooves, a piston made the reverse of present practice in that it is initially larger in diameter than the diameter of the bore of the cylinder, a piston characterized by the feature of being expansible and contractable automatically under the varying condition to which it is subjected, a piston enabled, by its construction, to fit the cylinder snugly at all times.

For the purpose of enabling others to clearly understand, make, and operate this invention the following description is given supplemented by the accompanying drawings, in which.

Figure 1:
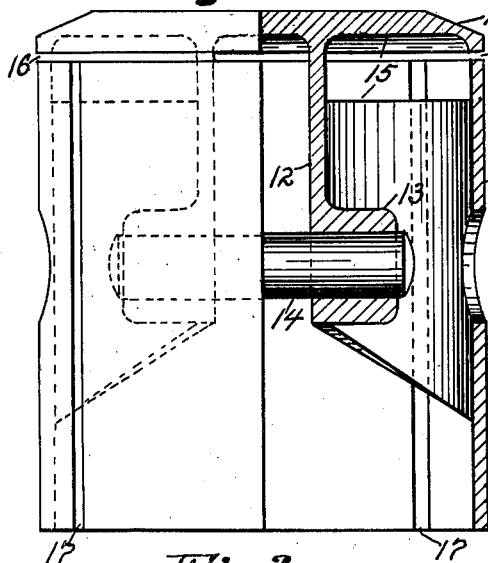
Figure 1 is a vertical elevation partly in section as of the line X—X Figure 3.
Figure 2:
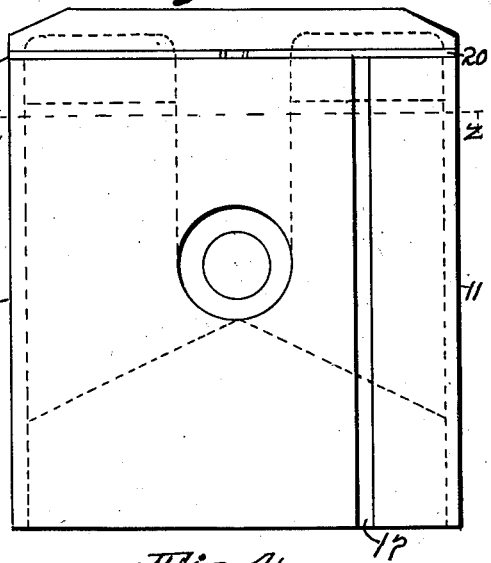
Figure 2 is a vertical side elevation viewed in the direction indicated by the arrow Figure 3.
Figure 3:
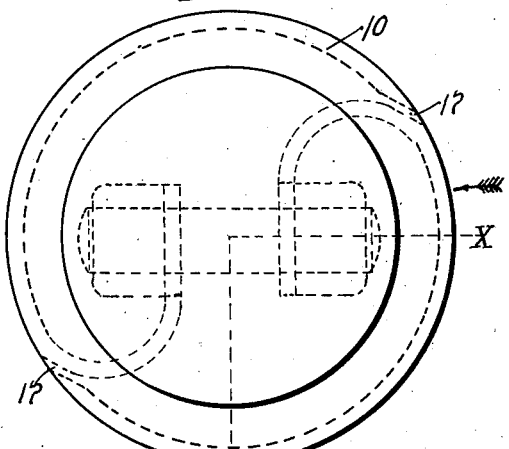
Figure 3 is a plan view.
Figure 4:
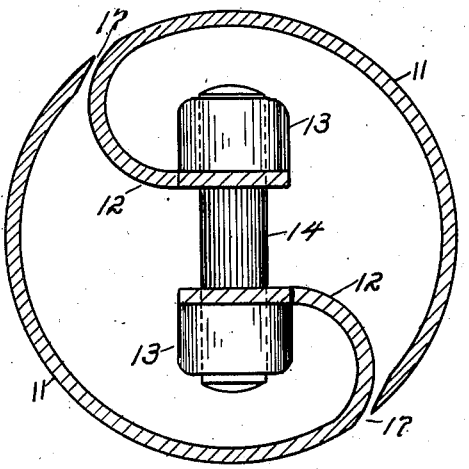
Figure 4 is a plan view in section of Figure 2 as of the line Z—Z Figure 2.

In the drawings like numerals of reference indicate corresponding parts throughout the several figures. The numeral 10 designates the head portion of this construction, 11 the body portion, the portions 10 and 11 are united integrally by internal ribs 12 a portion of which has an intersection integrally with the head 10 and the other portion extends radially and has its intersection with the body 11. The ribs 12 have bosses 13 formed thereto which are drilled or bored to receive a pin 14 which connects the piston with the other operable parts of the engine. The ribs 12, are especially constructed to support and unite the head 10 and the body 11 and also to support bosses 13, experience has proven this construction to have an advantage in that of preventing distortion of the body 11, due to the stresses to which a piston is subjected by reason of the angularity of the different positions of the connecting rod while the engine is in operation. The ribs 12, in this case carry the parts connecting the piston with the engine more yieldingly than would be the case were the bosses 13 directly supported by the body 11, resulting in a more smoothly running engine having less vibration. The radially extending portion of the ribs 12, is not connected with the head 10, there being a space 15, between the under side of the head 10, and the upper end of the ribs 12, this permits the U shaped cross section of the ribs 12, to have a yielding effect when in operation both in lateral and circular direction, that is to say the body 11, will yield diametrally and circularly when subjected to pressure from the sides.

In the manufacture of this improved construction of piston the head 10, the body 11, with ribs 12, and bosses 13, are cast to form from cast iron or suitable alloy composition metal the hole in the bosses 13, for the connecting pin 14, is cored to approximately the size to which it is finally to be finished the cored hole extending through the body 11, in alignment with the hole in the bosses 13, the space 15, between the under side of the head 10, and the top of the radial portion of the ribs 12, is also cored at the time of casting the entire body. The external surface of the head 10, and the body 11, is subjected to a machining process for the purpose of dressing the head 10, and to size the body 11, so that it will properly fit into the cylinder. At this point a change is made just the reverse of that which is the practice in sizing the conventional type of pistons for instead of machining the body of the piston smaller than the bore of the cylinder into which it is to operate, as is the common practice, my improved piston is machined to a size approximately of .005 of an inch larger than the bore of the cylinder.

When the head 10, and body 11, are thus machined to size the head 10, and the body 11, are then parted from each other at 16, by using a very thin parting tool and cutting through the body 11, adjacent the head 10, a very thin opening 16, is effected parting the head 10, from the body 11.

The next operation is to cut very thin slits 17, adjacent the intersection of the radial ribs 12, with the body 11, cutting through the body 11, and longitudinal of its axis terminating at the parting 16, just beneath the head 10. The resulting consequences of this operation renders the body 11, resilient, that is, the body will yield radially and circularly so that it can be placed tensionally in a cylinder having a bore less in diameter than that to which the piston was sized.

Figure 5:
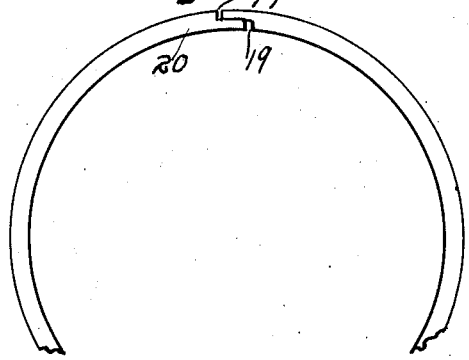
Figure 5 is a fragmentary view in elevation of a member part of this construction.
Figure 6:
Figure 6 is a side view of Figure 5.

The piston thus made will fit the cylinder very properly but it would not prevent the compression leakage or the escapage of gases through the parting at 16, between the edge of the head 10, and the edge of the body 11. To effect a seal at the parting 16, a thin sheet metal ring 18, Figures 5, and 6, is inserted into this space, this ring is split at 19, with lapping portions 20, one above the other for a distance of about ⅛ of an inch.

The function of the split metal ring 18, is to to seal the opening 16.

From the foregoing description it is clear that this construction fulfills the purpose for which it is intended. The body 11, being resiliently expansible and contractable renders the use of split metal piston rings unnecessary, doing away entirely with grooves cut in the piston for the rings, eliminating this source of danger to the cylinder by reason of the accummulation of carbon therein which tends to build up beneath the rings forcing them against the cylinder walls causing the scoring of the cylinder.

It is finally to be noted that the body portion 11, is turned to a size over its full length to an amount approximately .005 of an inch larger than the bore of the cylinder into which it is to operate. The effect of splitting the body 11, at diametrically opposite position as at 17, and assisted by the U shaped portion of ribs 12, provides the condition for uniform circular expansion and contraction of the body 11, effecting a uniform tensional fit in the cylinder.

It is understood that minor changes may be made in the size, form and shape of this structure without departing from the spirit of this invention within the scope of the appended claims.

Having thus described the invention what I claim and desire to secure by Letters Patent is:

1. A piston having its head and body integrally connected by means of internal yielding ribs, a parting between the head and body, slits cut through said body, sealing means for said head and body, and means provided on said internal ribs adapted to form engaging connection with operable parts for said piston.

2. A piston having internal yielding ribs integrally connecting the head and body portions of said piston, said head and body portion being parted from each other, sealing means positioned in said parting between the head and body, slits cut through the body portion of said piston providing resiliency for said body and means provided on said internal ribs adapted to form engaging connection with operable parts for said piston.

3. In a piston of the class described, a cup-like head comprising a pressure receiving end and a wall portion, a skirt circumferentially disconnected from the wall portion of the head and divided from end to end, and skirt carriers connecting said skirt to the pressure receiving end, said skirt carriers being disconnected from the wall portion of the head and susceptible of being slightly flexed radially.

4. A piston comprising a head, a skirt having resilient sections separated from said head by a slit extending continuously around the piston, and means for yieldingly connecting said skirt sections with said head.

5. A piston having a skirt at least a portion of which is separated from the head by a slot in which a piston ring is adapted to be mounted, said portion of the skirt being supported from the head by a flexible interior rib member.

In confirmation hereof I hereto attach my signature.

STEPHEN D. HARTOG.